United States Patent
VerNooy

(10) Patent No.: US 6,710,010 B2
(45) Date of Patent: Mar. 23, 2004

(54) ZIRCONIA CATALYSTS FOR NITROUS OXIDE ABATEMENT

(75) Inventor: Paul Douglas VerNooy, Hockessin, DE (US)

(73) Assignee: E. I. du Pont de Nemours and Company, Wilmington, DE (US)

(*) Notice: Subject to any disclaimer, the term of this patent is extended or adjusted under 35 U.S.C. 154(b) by 211 days.

(21) Appl. No.: 10/086,307

(22) Filed: Feb. 28, 2002

(65) Prior Publication Data

US 2002/0123424 A1 Sep. 5, 2002

Related U.S. Application Data

(60) Provisional application No. 60/272,979, filed on Mar. 2, 2001.

(51) Int. Cl.$^7$ .................................................. B01J 23/00
(52) U.S. Cl. ...................................................... 502/349
(58) Field of Search .................................. 502/325, 326, 502/333, 334, 335, 336, 338, 349

(56) References Cited

U.S. PATENT DOCUMENTS

| | | | | | |
|---|---|---|---|---|---|
| 3,907,714 | A | * | 9/1975 | Compton et al. | 502/304 |
| 4,851,381 | A | * | 7/1989 | Hums | 502/209 |
| 5,314,673 | A | * | 5/1994 | Anseth et al. | 423/239.1 |
| 5,520,895 | A | * | 5/1996 | Sharma et al. | 423/239.2 |

* cited by examiner

*Primary Examiner*—Stanley S. Silverman
*Assistant Examiner*—Edward M. Johnson
(74) *Attorney, Agent, or Firm*—Barbara C. Siegell

(57) ABSTRACT

This invention relates to methods of producing catalysts comprising zirconia and their use in nitrous oxide abatement. The catalysts have relatively high crush strength and relatively low density when compared to those catalysts made by previously known methods.

31 Claims, No Drawings

ZIRCONIA CATALYSTS FOR NITROUS OXIDE ABATEMENT

FIELD OF THE INVENTION

The present invention relates to methods of producing catalysts comprising zirconia and their use in nitrous oxide abatement. The catalysts have relatively high crush strength and relatively low density when compared to those catalysts made by previously known methods.

TECHNICAL BACKGROUND

Zirconia is not an easy support material to fabricate. Unlike alumina- or silica-containing supports, pure zirconia extrudates have traditionally been difficult to make strong without resorting to very high sintering temperatures, which dramatically reduces the surface area of the support. Thus, zirconia extrudates usually include alumina or silica to strengthen them, or the zirconia is tableted instead of extruded. Extrudates have several advantages over tablets: they are cheaper to produce in bulk, they have a wider choice of cross sections, and they typically have higher porosity and lower tap densities. Depending on the reaction chemistry, impurities in the zirconia support, such as alumina, silica, or iron, may not be tolerable. It is known that small amounts of hafnium are a normal impurity in zirconium compounds and are generally not a concern, since the chemistries of hafnium and zirconium are very similar.

The production of zirconia-based catalysts and their use in nitrous oxide abatement is known. However, in general, the starting material is $ZrO_2$, not $Zr(OH)_4$ as disclosed herein, nor is it a mixture of particle sizes, an acidic solution, or a combination thereof employed.

Japanese Patent Application 05168921A (Jul. 2, 1993) discloses the use of $Zr(OH)_4$ and a zirconium salt. No mention is made of a mixture of particle sizes or of the beneficial effect of acid dilution of the salt solution.

Commonly owned U.S. patent application, Ser. No. 515, 006 (filed Feb. 29, 2000) discloses zirconia catalysts, including iron, and their subsequent use in nitrous oxide abatement. However, iron is an intrinsic part of these catalysts, and thus such preparations are not directly comparable to the pure zirconia supports disclosed herein.

Nitrous oxide is a greenhouse and ozone-depleting gas, and is a by-product of adipic and nitric acid manufacturing. There is a need for catalysts which can decompose $N_2O$ into $N_2$ and $O_2$, have long lifetimes, can survive high-temperature excursions, are inexpensive, and are strong enough to resist breakage in handling and use.

SUMMARY OF THE INVENTION

Disclosed is a process for making a zirconia catalyst, comprising the steps of:
(a) preparing a paste comprising a step selected from the group consisting of:
  (i) mixing zirconium hydroxide with a solution of zirconyl nitrate, water, and nitric acid;
  (ii) mixing relatively fine particle size zirconium hydroxide and relatively coarse particle size zirconium hydroxide with a solution of zirconyl nitrate and water; and
  (iii) mixing relatively fine particle size zirconium hydroxide and relatively coarse particle size zirconium hydroxide with a solution of zirconyl nitrate, water, and nitric acid;
wherein, in (i), (ii), and (iii) there may be one or more additional solvents added in addition to water;
(b) forming a shaped particle from the step (a) paste;
(c) drying the step (b) shaped particle; and
(d) calcining the dried step (c) shaped particle at a temperature of at least 400° C.

In the above process one can optionally add at least one metal selected from the group consisting of cobalt, nickel, rhodium, palladium, iridium, platinum, manganese, lanthanum, and cerium to step (a) or to the calcined step (d) shaped particle.

In the above process one can also optionally add at step (a) one or more additives selected from the group consisting of binders, lubricants, rheology control agents, and pore forming agents.

Further disclosed is a catalyst comprising zirconia, prepared by the steps of:
(a) preparing a paste comprising a step selected from the group consisting of:
  (i) mixing zirconium hydroxide with a solution of zirconyl nitrate, water, and nitric acid;
  (ii) mixing relatively fine particle size zirconium hydroxide and relatively coarse particle size zirconium hydroxide with a solution of zirconyl nitrate and water; and
  (iii) mixing relatively fine particle size zirconium hydroxide and relatively coarse particle size zirconium hydroxide with a solution of zirconyl nitrate, water, and nitric acid;
wherein, in (i), (ii), and (iii) there may be one or more additional solvents added in addition to water;
(b) forming a shaped particle from the step (a) paste;
(c) drying the step (b) shaped particle; and
(d) calcining the dried step (c) shaped particle at a temperature of at least 400° C.

In making the above composition one can optionally add at least one metal selected from the group consisting of cobalt, nickel, rhodium, palladium, iridium, platinum, manganese, lanthanum, and cerium to step (a) or to the calcined step (d) shaped particle.

The above composition can optionally be made wherein one or more additives selected from the group consisting of binders, lubricants, rheology control agents, and pore forming agents are added at step (a).

DETAILS OF THE INVENTION

The present invention relates to the preparation of high strength, low density, zirconia catalyst supports, and their subsequent use in nitrous oxide abatement. A zirconia extrudate is conventionally made by mixing zirconium hydroxide with a solution of water and zirconyl nitrate. Generally speaking, there are herein described three embodiments of the invention which entail changes to this conventional process: 1) mixing relatively fine (on the order of 1 $\mu$m) $Zr(OH)_4$ and relatively coarse (on the order of 15 $\mu$m) $Zr(OH)_4$ with subsequent extrusion; 2) diluting a zirconyl nitrate solution with about 10–16% nitric acid to achieve a "15% $ZrO_2$" solution; and 3) a combination of 1) and 2) as described above.

The process of this invention also includes the use of one or more solvents selected from conventional liquid solvents that are inert in the context of the process of the present invention and easily removed by drying (evaporation) and/or by combustion during calcination. These solvents include water; alcohols, such as methanol, ethanol and propanol;

ketones, such as acetone and 2-butanone; aldehydes, such as propanal and butanal; and aromatic solvents such as toluene and benzene. Water is the preferred solvent.

The amount of solvent used in preparing the paste of step (a) is an amount that provides a consistency which allows for a shaped particle to be mechanically formed out of the paste, but the amount of solvent in the paste should not make it so fluid as to fail to hold its form or shape or become sticky and agglomerate with other particles. Typically, the total amount of solvent in the paste is from about 10% to about 40% by weight of the paste.

The paste of the present process may also contain rheology control agents and pore forming agents. Rheology control agents include starches, sugars, glycols, polyols, powdered organic polymers, graphite, stearic acid and its esters. Pore forming agents include graphite, polypropylene or other organic polymer powders, activated carbon, charcoal, starches, and cellulose flour. The rheology control agents and pore forming agents (some materials may perform both functions) are well known to those of ordinary skill in the art and are used as necessary to obtain the desired viscosity of the paste or porosity of the formed particle, as the case may be. Typically, any of these may be present in the amount of from about 0.5% to about 20% by weight, preferably, from about 1% to about 10% by weight of the paste. The rheology control agents and pore forming agents incorporated in the paste are removed from the finished shaped particle by a combination of volatilization and combustion during the final steps of drying and calcination of the shaped particle.

A formed or shaped particle is then prepared from the paste. Extrusion is the preferred forming technique. The formed particle may have a variety of cross sections such as cylinders, trilobes, or star shaped. The formed particles are air dried under conditions sufficient to form a particle that is not malleable (or soft) or friable. The dried formed particles are then calcined in air or in inert gases such as nitrogen or argon or mixtures thereof at a temperature of from about 400° C. to about 650° C. The result is a surprisingly hard and porous zirconia formed particle. The crush strength of the shaped particles is at least about 65 newtons (14.6 pounds).

Because the materials produced by this invention have a lower density compared to tableted zirconia (typically 25 to 50% lower), they have the advantage of being less expensive to produce and use.

The catalytic metals are present in the amount of from about 0.1 weight percent to about 10 weight percent. A preferred catalyst composition contains nickel and cobalt on the zirconia shaped particle. The ratio of nickel to cobalt in the catalyst is from about 0.5:1 to about 3:1.

Nitrous oxide is contacted with a catalyst of this invention. The nitrous oxide may be diluted with other gaseous components such as nitrogen, oxygen, argon, and helium. A typical feed gas from an adipic acid plant which uses nitric acid as the oxidant contains about 10 volume % nitrous oxide; however, higher or lower feed rates are practical both for nitrous oxide produced in adipic acid plants and for other nitrous oxide sources, such as produced during the manufacture of nitric acid. Typical flow rates for nitrous oxide from an adipic acid plant may vary from about 30,000 hr$^{-1}$ to about 40,000 hr$^{-1}$. Again, as is true for the feed gas composition, higher or lower space velocities can be used. The reaction temperature depends on a number of factors such as preheat temperature, nitrous oxide concentration, catalyst composition, etc. The present invention is not dependent on reaction pressure.

Since, in the manufacture of adipic acid by the nitric acid oxidation of a mixture of cyclohexanol/cyclohexanone, nitrous oxide is produced as a by-product, the present invention provides a convenient method of decomposing the by-product nitrous oxide. The method involves contacting the nitrous oxide with a catalyst composition of this invention.

Definitions

The crush strengths were tested with an Imada digital force gauge, model DPS-44R mounted on the SV1 lever-operated stand. A piece of calcined extrudate (>⅛" (3.2 mm) in length) is put perpendicular to the ⅛" (3.2 mm) wide jaws, and increasing force is applied until the extrudate is crushed. The peak load is recorded. The reported average is based on 51 trials.

The terms zirconium hydroxide and $Zr(OH)_4$ are used interchangeably to mean a form of hydrous zirconia, and are not intended to imply the stoichiometry is exactly "$Zr(OH)_4$."

Unless otherwise stated, all chemicals and reagents were used as received from Aldrich Chemical Co., Milwaukee, Wisc.

EXAMPLE 1

Use of Nitric Acid Diluent

Zirconyl nitrate solution ("20% $ZrO_2$," 159.22 g), obtained from Magnesium Elecktron, Inc. (MEI, 500 Point Breeze Road, Flemington, N.J. 08822), was diluted to 214.66 g with 10% $HNO_3$. The resultant solution contained "14.8% $ZrO_2$." Zirconium hydroxide (238.60 g, 15μ, pre-dried at 95° C. in vacuo), obtained from Magnesium Elektron, Ltd. (MEL, P.O. Box 6, Lumns Lane, Swinton, Manchester, England M27 2LS) was mixed with 8.67 g hydroxyethylcellulose. The solution was added to the powder to form a paste. The paste was extruded four times into ⅛" (3.2 mm) trilobes using a Bonnot 1" (25.4 mm) lab extruder to thoroughly mix the paste. After the fourth time through the extruder, the extrudates were allowed to air dry. The dried extrudates were calcined in air with the following temperature program: ramped from 25° C. to 100° C. over 3 hours, soaked 1 hour; ramped over 3 hours to 300° C., soaked 2 hours; ramped over 3 hours to 500° C., soaked 4 hours. The crush strength of the fired extrudates was 14.6±3.6 pounds (64.9 newtons), a 1.5-fold improvement over the baseline case (see Comparative Example A).

A sample of the fired extrudates were broken into ⅛" (3.2 mm) long pieces and loaded with 1.5% Co and 1.5% Ni via roto-evaporation of a methanol solution of the nitrate salts. The metal-loaded extrudates were then calcined again for 1 hour at 500° C. to decompose the salts and produce the catalyst.

The catalyst extrudates (10 mL, 11.8 g) were loaded into a tubular reactor and heated to 650° C. under flowing 10% $N_2O$/90% $N_2$ (3.0 L/min). The fresh catalyst decomposed 100% of the $N_2O$. The catalyst was then removed from the reactor and heated at 800° C. for 2 hours in air to simulate catalyst aging and reactor exotherms. Upon retesting at 650° C., the aged catalyst decomposed 96.9% of the $N_2O$.

This example shows how diluting the zirconyl nitrate solution with 10% nitric acid instead of water not only improves the strength of the resulting catalyst, but lowers its tap density as well. Activity of the catalyst is unaffected.

EXAMPLE 2

Mixture of Coarse and Fine $Zr(OH)_4$

"Fine" zirconium hydroxide (MEL, 1μ, 40.00 g), and "coarse" zirconium hydroxide (MEL, 200.00 g, 15μ), both pre-dried in vacuo at 98° C., were mixed with 8.40 g hydroxyethylcellulose. A "15% $ZrO_2$" solution was prepared by diluting a "20% $ZrO_2$" zirconyl nitrate solution (MEI) with water. Sufficient solution was added to the powder to form a paste. The paste was extruded four times into ⅛" (3.2 mm) trilobes using a Bonnot 1" (25.4 mm) lab extruder in order to thoroughly mix the paste. After the fourth time through the extruder, the extrudates were allowed to air dry. The dried extrudates were calcined in air with the following temperature program: ramped from 25° C. to 100° C. over 3 hours, soaked 1 hour; ramped over 3 hours to 300° C., soaked 2 hours; ramped over 3 hours to 500° C., soaked 4 hours. The crush strength of the fired extrudates was 24.2±5.3 pounds (108 newtons), a 2.5-fold improvement over the baseline case (see Comparative Example A).

A sample of the fired extrudates were broken into ⅛" (3.2 mm) long pieces and loaded with 1.5% Co and 1.5% Ni via roto-evaporation of a methanol solution of the nitrate salts. The metal-loaded extrudates were then calcined again for 1 hour at 500° C. to decompose the salts.

The catalyst extrudates (10 mL, 12.8 g) were loaded into a tubular reactor and heated to 650° C. under flowing 10% $N_2O$/90% $N_2$ (3.0 L/min). The fresh catalyst decomposed 97.8% of the $N_2O$. The catalyst was then removed from the reactor and heated at 800° C. for 2 hours in air to simulate catalyst aging and reactor exotherms. Upon retesting at 650° C., the aged catalyst decomposed 92.0% of the $N_2O$.

This example shows how the addition of a small amount (~17%) of fine zirconia can dramatically increase the strength of the resulting extrudates. Surprisingly, a further increase in the concentration of fine zirconia in the powder does not continue to increase the strength. When it was increased to 60 g (23%) in an otherwise identical preparation, the crush strength dropped to 19.4±4.9 pounds (86.3 newtons).

EXAMPLE 3

Use of Nitric Acid Diluent and a Coarse/Fine Mixture Together

Zirconyl nitrate solution (MEI, "20% $ZrO_2$", 138.85 g) was diluted to 186.69 g with 10% $HNO_3$. The diluted solution contained "14.9% $ZrO_2$." "Coarse" zirconium hydroxide (MEL, 173.87 g, 15$\mu$) and "fine" zirconium hydroxide (MEL, 34.76 g, 1$\mu$), both pre-dried at ~100° C. in vacuo, were mixed with 7.71 g hydroxyethylcellulose. The solution was added to the powder to form a paste. The paste was extruded four times into ⅛" (3.2 mm) trilobes using a Bonnot 1" (25.4 mm) lab extruder to thoroughly mix the paste. After the fourth time through the extruder, the extrudates were allowed to air dry. The dried extrudates were calcined in air with the following temperature program: ramped from 25° C. to 500° C. at 1° C./min, soaked 4 hours. The crush strength of the fired extrudates was 27.0±6.4 pounds (120 newtons), a 2.8-fold improvement over the baseline case (see Comparative Example A).

A sample of the fired extrudates were broken into ⅛" (3.2 mm) long pieces and loaded with 1.5% Co and 1.5% Ni via roto-evaporation of a methanol solution of the nitrate salts. The metal-loaded extrudates were calcined again for 1 hour at 500° C. to decompose the salts and produce the catalyst.

The catalyst extrudates (10 mL, 13.7 g) were loaded into a tubular reactor and heated to 650° C. under flowing 10% $N_2O$/90% $N_2$ (3.0 L/min). The fresh catalyst decomposed 100% of the $N_2O$. The catalyst was then removed from the reactor and heated at 800° C. for 2 hours in air to simulate catalyst aging and reactor exotherms. Upon retesting at 650° C., the aged catalyst decomposed 93.8% of the $N_2O$.

This example shows that combining the nitric acid dilution with the mixture of coarse and fine powder gives better strength than either method alone.

EXAMPLE 4

Use of 16% Nitric Acid Diluent

Zirconyl nitrate solution (MEI, "20% $ZrO_2$", 156.06 g) was diluted to 208.65 g with 15.9% $HNO_3$. The diluted solution contained "15.0% $ZrO_2$." Zirconium hydroxide (MEL, 238.80 g, 15$\mu$, pre-dried at 93° C. in vacuo) was mixed with 8.79 g hydroxyethylcellulose. The solution was added to the powder to form a paste. The paste was extruded using a Bonnot 1" (25.4 mm) lab extruder four times into ⅛" (3.2 mm) trilobes to thoroughly mix the paste. After the fourth time through the extruder, the extrudates were allowed to air dry. The dried extrudates were calcined in air with the following temperature program: ramped from 25° C. to 100° C. over 3 hours, soaked 1 hour; ramped over 3 hours to 300° C., soaked 2 hours; ramped over 3 hours to 500° C., soaked 4 hours. The crush strength of the fired extrudates was 19.2±4.8 pounds (85.4 newtons), a two-fold improvement over the baseline case (see Comparative Example A).

A sample of the fired extrudates were broken into ⅛" (3.2 mm) long pieces and loaded with 1.5% Co and 1.5% Ni via roto-evaporation of a methanol solution of the nitrate salts. The metal-loaded extrudates were calcined again for 1 hour at 500° C. to decompose the salts and produce the catalyst.

The catalyst extrudates (10 mL, 12.2 g) were loaded into a tubular reactor and heated to 650° C. under flowing 10% $N_2O$/90% $N_2$ (3.0 L/min). The fresh catalyst decomposed 100% of the $N_2O$. The catalyst was then removed from the reactor and heated at 800° C. for 2 hours in air to simulate catalyst aging and reactor exotherms. Upon retesting at 650° C., the aged catalyst decomposed 96.2% of the $N_2O$.

The use of 16% $HNO_3$ rather than 10% $HNO_3$ as a diluent enhances the strength of the resulting extrudate.

COMPARATIVE EXAMPLE A

Zirconium hydroxide (MEL, 210.64 g, 15$\mu$), dried to an LOI (loss-on-ignition) of 12.7%, was mixed with 7.50 g hydroxyethylcellulose. To this, 180.32 g of "15.0% $ZrO_2$" zirconyl nitrate solution (made by diluting the MEI "20% $ZrO_2$" solution with water) was added to form a paste. The paste was extruded four times into ⅛" (3.2 mm) trilobes using a Bonnot 1" (25.4 mm) lab extruder in order to thoroughly mix the paste. After the fourth time through the extruder, the extrudates were allowed to air dry. The dried extrudates were calcined in air with the following temperature program: ramped from 25° C. to 100° C. over 3 hours, soaked 1 hour; ramped over 3 hours to 300° C., soaked 2 hours; ramped over 3 hours to 500° C., soaked 4 hours. The crush strength of the fired extrudates was 9.8±1.9 pounds (44 newtons).

A sample of the fired extrudates were broken into ⅛" (3.2 mm) long pieces and loaded with 1.5% Co and 1.5% Ni via roto-evaporation of a methanol solution of the nitrate salts. The metal-loaded extrudates were then calcined again for 1 hour at 500° C. to decompose the salts.

The catalyst extrudates (10 mL, 12.6 g) were loaded into a tubular reactor and heated to 650° C. under flowing 10% $N_2O$/90% $N_2$ (3.0 L/min). The fresh catalyst decomposed 100% of the N₂O. The catalyst was then removed from the reactor and heated at 800° C. for 2 hours in air to simulate catalyst aging and reactor exotherms. Upon retesting at 650° C., the aged catalyst decomposed 97.6% of the N₂O.

COMPARATIVE EXAMPLE B

Use of Higher Concentrations of Zirconium Nitrate Solution

Zirconium hydroxide (MEL, 241.18 g, 15µ), pre-dried in vacuo at 97° C., was mixed with 8.45 g hydroxyethylcellulose. To this, 304.62 g of "29.1% $ZrO_2$," zirconyl nitrate solution (MEI) was added to form a paste. The paste was extruded four times into ⅛" (3.2 mm) trilobes using a Bonnot 1" (25.4 mm) lab extruder in order to thoroughly mix the paste. After the fourth time through the extruder, the extrudates were allowed to air dry. The dried extrudates were calcined in air with the following temperature program: ramped from 25° C. to 100° C. over 3 hours, soaked 1 hour; ramped over 3 hours to 300° C., soaked 2 hours; ramped over 3 hours to 500° C., soaked 4 hours. The crush strength of the fired extrudates was 9.3±3.7 pounds (41 newtons).

Surprisingly, increasing the concentration of the zirconyl nitrate solution, and thus its ceramic yield, does not produce a stronger extrudate.

COMPARATIVE EXAMPLE C

Use of Higher Amount of Nitric Acid Diluent

Zirconyl nitrate solution (MEI, "20% $ZrO_2$", 115.15 g) was diluted to 230.98 g with 10% $HNO_3$. The resulting solution contained "10% $ZrO_2$." 278.17 g of 15µ zirconium hydroxide (MEL, pre-dried at 102° C. in vacuo) was mixed with 9.92 g hydroxyethylcellulose. The solution was added to the powder to form a paste. The paste was extruded four times into ⅛" (3.2 mm) trilobes using a Bonnot 1" (25.4 mm) lab extruder to thoroughly mix the paste. After the fourth time through the extruder, the extrudates were allowed to air dry. The dried extrudates were calcined in air with the following temperature program: ramped from 25° C. to 10° C. over 3 hours, soaked 1 hour; ramped over 3 hours to 300° C., soaked 2 hours; ramped over 3 hours to 500° C., soaked 4 hours. The crush strength of the fired extrudates was 10.7±2.3 pounds (47.6 newtons).

Surprisingly, while diluting the zirconyl nitrate solution with some 10% $HNO_3$ is beneficial, diluting it too far reduces the strength of the resulting extrudates.

COMPARATIVE EXAMPLE D

Use of Higher Concentration Nitric Acid Diluent

Zirconyl nitrate solution (MEI, "20% $ZrO_2$", 154.28 g) was diluted to 205.71 g with 22.3% $HNO_3$. The diluted solution contained "15.0% $ZrO_2$." Zirconium hydroxide (MEL, 236.31 g, 15µ, pre-dried at 96° C. in vacuo) was mixed with 8.93 g hydroxyethylcellulose. The solution was added to the powder to form a paste. The paste was extruded using a Bonnot 1" (25.4 mm) lab extruder four times into ⅛" (3.2 mm) trilobes to thoroughly mix the paste. After the fourth time through the extruder, the extrudates were allowed to air dry. The dried extrudates were calcined in air with the following temperature program: ramped from 25° C. to 10° C. over 3 hours, soaked 1 hour; ramped over 3 hours to 300° C., soaked 2 hours; ramped over 3 hours to 500° C., soaked 4 hours. The crush strength of the fired extrudates was 15.1±3.2 pounds (67.2 newtons).

A sample of the fired extrudates were broken into ⅛" (3.2 mm) long pieces and loaded with 1.5% Co and 1.5% Ni via roto-evaporation of a methanol solution of the nitrate salts. The metal-loaded extrudates were calcined again for 1 hour at 500° C. to decompose the salts and produce the catalyst.

The catalyst extrudates (10 mL, 11.8 g) were loaded into a tubular reactor and heated to 650° C. under flowing 10% N2O/90% N2 (3.0 L/min). The fresh catalyst decomposed 100% of the N2O. The catalyst was then removed from the reactor and heated at 800° C. for 2 hours in air to simulate catalyst aging and reactor exotherms. Upon retesting at 650° C., the aged catalyst decomposed 93.7% of the N2O.

What is claimed is:

1. A process for making a zirconia catalyst, comprising the steps of:
    (a) preparing a paste comprising a step selected from the group consisting of:
        (i) mixing zirconium hydroxide with a solution of zirconyl nitrate, water, and nitric acid;
        (ii) mixing relatively fine particle size zirconium hydroxide and relatively coarse particle size zirconium hydroxide with a solution of zirconyl nitrate and water; and
        (iii) mixing relatively fine particle size zirconium hydroxide and relatively coarse particle size zirconium hydroxide with a solution of zirconyl nitrate, water, and nitric acid;
    wherein, in (i), (ii), and (iii) there may optionally be one or more additional solvents added in addition to water;
    (b) forming a shaped particle from the step (a) paste;
    (c) drying the step (b) shaped particle; and
    (d) calcining the dried step (c) shaped particle at a temperature of at least 400° C.

2. The process of claim 1 wherein one or more additional solvents are added to step (a)(i), (a)(ii), or (a)(iii) of claim 1.

3. The process of claim 1 or claim 2 additionally comprising adding at least one metal selected from the group consisting of cobalt, nickel, rhodium, palladium, iridium, platinum, manganese, lanthanum, and cerium to step (a) or to the calcined step (d) shaped particle.

4. The process of claim 1 or claim 3 comprising adding one or more additives selected from the group consisting of binders, lubricants, rheology control agents, and pore forming agents.

5. The process of claim 1, wherein the optional solvent is selected from the group consisting of alcohol, ketones, aldehydes, aromatic solvents, and combinations thereof.

6. The process of claim 1, wherein the amount of one or more solvents in the paste is 10%–40% by weight of the paste.

7. The process of claim 3, wherein a rheology control agent or a pore forming agent is added in step (a).

8. The process of claim 7, wherein the rheology control agent or pore forming agent is present in an amount of 0.5% to 20% by weight of the paste.

9. The process of claim 3, wherein the metal added is cobalt at a level of 0.1% to 10%.

10. The process of claim 9, wherein the level is 0.5% to 5%.

11. The process of claim 10, wherein the level is 1% to 3%.

12. The process of claim 3, wherein the metals added are cobalt and nickel at a combined level of 0.1% to 10%.

13. The process of claim 12, wherein the combined level is 0.5% to 5%.

14. The process of claim 13, wherein the combined level is 1% to 3%.

15. The process of claim 1, wherein the shaped particle of step (b) is formed by extrusion.

16. A catalyst comprising zirconia, prepared by the steps of:
(a) preparing a paste comprising a step selected from the group consisting of:
(i) mixing zirconium hydroxide with a solution of zirconyl nitrate, water, and nitric acid;
(ii) mixing relatively fine particle size zirconium hydroxide and relatively coarse particle size zirconium hydroxide with a solution of zirconyl nitrate and water; and
(iii) mixing relatively fine particle size zirconium hydroxide and relatively coarse particle size zirconium hydroxide with a solution of zirconyl nitrate, water, and nitric acid;
wherein, in (i), (ii), and (iii) there may optionally be one or more additional solvents added in addition to water;
(b) forming a shaped particle from the step (a) paste;
(c) drying the step (b) shaped particle; and
(d) calcining the dried step (c) shaped particle at a temperature of at least 400° C.

17. The catalyst of claim 16 additionally comprising adding at least one metal selected from the group consisting of cobalt, nickel, rhodium, palladium, iridium, platinum, manganese, lanthanum, and cerium to step (a) or to the calcined step (d) shaped particle.

18. The catalyst of claim 16 or claim 17 comprising adding one or more additives selected from the group consisting of binders, lubricants, rheology control agents, and pore forming agents.

19. The process of claim 16, wherein the optional solvent is selected from the group consisting of alcohol, ketones, aldehydes, aromatic solvents, and combinations thereof.

20. The catalyst of claim 16, wherein the amount of solvent in the paste is 10%–40% by weight of the paste.

21. The process of claim 16, wherein a rheology control agent or a pore forming agent is added in step (a).

22. The process of claim 21, wherein the rheology control agent or pore forming agent is present in an amount of 0.5% to 20% by weight of the paste.

23. The catalyst of claim 17, wherein the metal added is cobalt at a level of 0.1% to 10%.

24. The catalyst of claim 23, wherein the level is 0.5% to 5%.

25. The catalyst of claim 24, wherein the level is 1% to 3%.

26. The catalyst of claim 17, wherein the metals added are cobalt and nickel at a combined level of 0.1% to 10%.

27. The catalyst of claim 26, wherein the combined level is 0.5% to 5%.

28. The catalyst of claim 27, wherein the combined level is 1% to 3%.

29. The catalyst of claim 16 or claim 17 wherein the crush strength is at least 65 newtons.

30. The process of claim 1 or claim 2 or claim 3 wherein the crush strength of the catalyst produced is at least 65 newtons.

31. The use of the catalyst of claim 3 or claim 17 used for $N_2O$ abatement.

* * * * *